Nov. 9, 1965 R. A. MAGINN 3,216,493
CONTINUOUS SHEET FORMATION
Filed Oct. 24, 1962
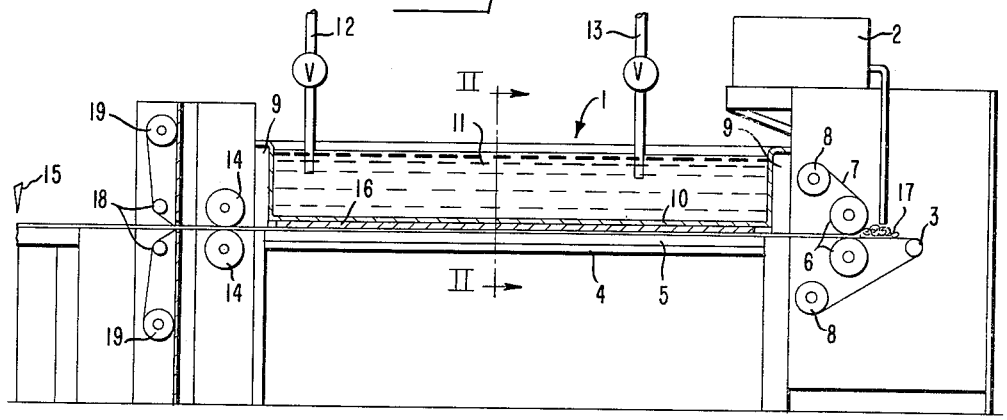
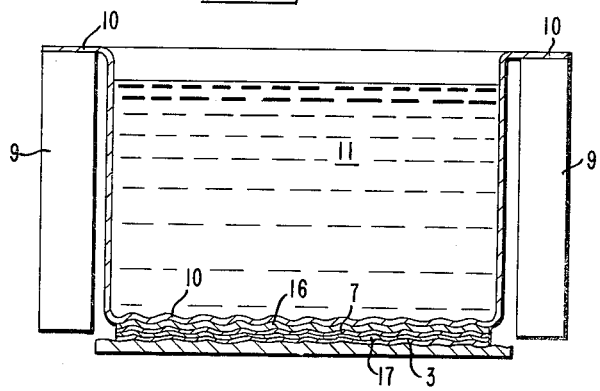
INVENTOR
ROBERT ALLEN MAGINN
BY  *Earl L. Handley*
ATTORNEY

United States Patent Office 3,216,493
Patented Nov. 9, 1965

3,216,493
CONTINUOUS SHEET FORMATION
Robert Allen Maginn, Wilmington, Del., assignor to E. I. du Pont de Nemours and Company, Wilmington, Del., a corporation of Delaware
Filed Oct. 24, 1962, Ser. No. 232,705
1 Claim. (Cl. 165—120)

This invention relates to an apparatus whereby heat may be readily applied to or removed from a moving plastic sheet while said sheet is under a predetermined pressure. Specifically, this invention relates to an apparatus whereby monomer to be polymerized, or polymer to be quenched is extruded under a diaphragm filled with heat exchange fluid.

An object of the present invention is to provide an apparatus whereby sheets may be heat treated continuously, although the surface is irregular and not uniform. A further object of the invention is to provide a means for forming a polymeric sheet in which the polymer sheet is molded by a flexible and a non-flexible mold in a continuous manner.

Further objects will become apparent from the remainder of the description and the accompanying drawing.

In the figures of the drawing, like parts are designated with like numbers. In the drawing:

FIGURE 1 is a cross-sectional longitudinal view of the apparatus for carrying out the process of the invention.

FIGURE 2 is a cross-sectional view taken along line II—II of FIGURE 1.

In general, the process for the invention is carried out by extruding the material to be subjected to heat exchange between moving sheets of carrier material. The moving sheets may be an endless band, or a continuous sheet. (FIGURE 1 shows a continuous sheet.) The moving sheets are then passed under the heat exchanger.

Referring to the drawings, FIGURE 1, the material to be treated is in hopper 2; this material is forced on to carrier strip 3 which passes over mold 4 having corrugated surface 5 and squeezed by roll 6 which also applies carrier strip 7 from roll 8 to the upper surface of the material. The carrier strips 3 and 7 and the enclosed material to be treated are then passed under heat exchange member 1 which comprises frame 9, and heat exchange membrane 10, and contains liquid 11. Suitable inlet 12 and outlet 13 means allow the passage of the fluid from the heat exchanger to suitable heaters or coolers (not shown).

Rollers 14 serve to pull the polymer sheet and the carrier sheets under the heat exchangers. The carrier sheets may be removed from the polymer sheet by means of rollers 18 and collected on rollers 19. Or, if desired, the carrier sheet may be left on the polymer surface as a protective layer during shipping.

The plastic material, after having undergone heat exchange while passing under heat exchanger 1, is cut up into suitable lengths by cutter 15.

Heat exchange membrane 10 (see FIGURE 2) must be made of material that will readily allow heat to pass, and must be thin enough that the membrane will deform and allow different shaped material to be moved under it, as well as allow irregularly shaped articles to pass under it. Suitably, the membrane is made of tetrafluoroethylene polymer or other fluorocarbon polymer, as for example a copolymer of tetrafluoroethylene and hexafluoropropylene. The membrane may also be of rubber with a layer of tetrafluoroethylene polymer laminated to the rubber surface. Likewise, it is necessary that the surface of the mold 5 be coated with tetrafluoroethylene polymer or equivalent material, so that the envelope of material to be treated will readily slip over the surface. In FIGURE 2, 10 designates a rubber diaphragm with a tetrafluoroethylene polymer 16, laminated thereto.

The carrier sheet may be cellophane, polyester film, such as poly(ethylene glycol terephthalate), polypropylene, polyvinyl acetate or polytetrafluoroethylene. The temperature of the fluid in the heat exchange diaphragm, of course, depends upon the particular material to be treated, but when the material to be treated is a methyl methacrylate containing polymer-in-monomer solution, the temperature is usually kept in the range of 40° C. to 70° C. When the apparatus is employed to polymerize methyl methacrylate polymer-in-monomer solution, the cure time is between 10 and 20 minutes.

The apparatus of the invention may be employed to cure reinforced sheets in which a reinforcing material, such as fiberglass, paper, asbestos, sisal, wood chips, and the like, and the polymer to be cured form a slurry. The reinforcing agent may comprise 5 to 65% by weight of the slurry, or the material to be cured may be unreinforced polymer-in-monomer solution or molten polymer. The apparatus of this invention can also be used to continuously apply coatings to form laminated articles by merely applying the material to be cured to the surface to be coated and passing the entire structure under the heat exchange membrane.

In the following examples which illustrate the invention, all parts are in parts by weight unless otherwise stated.

*Example I*

A sirup of methyl methacrylate polymer obtained by polymerizing 750 parts of methyl methacrylate with 0.10 part of benzoyl peroxide and heated to 80° C. until the sirup had a viscosity of about 10 poises, described more fully in U.S Patent 2,166,318, issued May 3, 1938, to J. B. Miles, Jr., was mixed with 250 parts of glass fibers having a diameter of about .00030 inch and ranging in length from 0.1 to 7 inches. The mixture was then transferred to hopper 2 and forced onto supporting sheet 3 of cellophane in such a manner that the entire surface of the sheet was thoroughly covered. Roll 6 served to meter the material and provide a more or less uniform thickness, although particular groups of glass fibers tended to form lumps after passing under this metering roll. The mixture was, at the same time it passed under metering roll 6, covered with upper supporting sheet 5. The mixture was then passed under heat exchange 1 in which the diaphragm bottom was made of tetrafluoroethylene polymer laminated to a poly(ethylene glycol terephthalate) film. The film thickness of poly(ethylene glycol terephthalate) was .009 and the tetrafluoroethylene polymer thickness was about .001. Water was pumped into the inlet 12 at a temperature of 70° C. ± 3° C., and water was removed at the outlet 13 at 60° C. ± 3° C. The sheet travelled at about .5 foot per minute and when it came from under the diaphragm, the methacrylate sirup was completely polymerized to solid polymer. The diaphragm was about 5 feet long and 2½ feet wide. About 1½ inches of water were in the diaphragm during polymerization.

*Example II*

A polyethylene composition having a density of .93 and a melt index of 20 g./10 min. as measured by ASTM method D–1238–52T, was placed in hopper 2 at a temperature of about 130° C. The polymer was in the molten state. The polymer was forced onto sheet 3 which, as in the previous example, was cellophane. The cellophane was applied as a top layer and the material pulled through the metering rolls and under the heat exchanger. The heat exchanger was filled with water at about 30° C. ± 3° C., the inlet temperature was about 27° C. and the outlet temperature was about 34° C. The polyethylene quickly solidified and was removed as a solid sheet. The cellophane layers served to protect the polymer from oxidation while it was being cooled.

*Example III*

A sirup of methyl methacrylate as described in Example I was added to hopper 2. No glass fibers were mixed with the sirup. The sirup was metered onto a glass mat at a rate sufficient to completely impregnate the glass mat. The glass mat prior to impregnation had a density of about 1 oz. per square foot. The glass mat was of the chopped strand type. Each glass strand was made up of 208 glass filaments; each filament had a diameter of about 0.00018 inch. The impregnated glass mat was passed under the heat exchange diaphragm. The temperature of the water in the heat exchange diaphragm was about 65° C. The impregnated glass mat traveled at about .4 foot per minute under the 5 feet heat exchange diaphragm. The glass mat was solid in form as it was withdrawn from under the heat exchange membrane; however, it appeared that a post cure might further decrease the amount of monomer present in the laminate. The laminate was heated in an oven to 110° C. for 10 minutes to increase the degree of polymerization.

Having thus described my invention, I claim the following:

A heat exchange apparatus comprising:
(a) a hopper adapted to force material to be treated onto a continuous moving sheet;
(b) a continuous sheet resting on a polyfluorocarbon polymer coated base, and means for feeding material from said hopper to said sheet;
(c) a metering roll mounted adjacent said continuous sheet for smoothing out the material to be treated, which is received by said continuous sheet from said hopper, into a layer of substantially uniform thickness;
(d) a second continuous sheet mounted adjacent the metering roll for contacting the upper surface of material to be treated;
(e) a heat exchange member comprising a frame and a continuous membrane attached to said frame, said membrane having a lower surface of fluorocarbon polymer, said lower surface being so located and arranged with respect to said second continuous sheet, that intimate physical contact exists between said surface and said sheet;
(f) means for circulating a heat exchange liquid through said heat exchange member;
(g) means for driving and moving said sheets serially through said metering roll and between said heat exchange member and said coated base.

References Cited by the Examiner

UNITED STATES PATENTS

| | | | |
|---|---|---|---|
| 1,943,466 | 1/34 | West et al. | 62—66 |
| 2,436,530 | 2/48 | Sando | 165—120 X |
| 2,682,390 | 6/54 | Pollard | 165—120 |
| 2,789,795 | 4/59 | Back et al. | 165—120 |
| 2,923,640 | 2/60 | Buckingham | 165—133 X |
| 3,082,683 | 3/63 | Justus | 165—90 |
| 3,094,513 | 6/63 | Kropa | 260—89.5 |
| 3,103,503 | 9/63 | Fox et al. | 260—89.5 |

CHARLES SUKALO, *Primary Examiner.*